June 11, 1968   J. M. WALTERS   3,387,864

PIPE COUPLING

Filed July 19, 1965

INVENTOR.
Joseph M. Walters
BY Wilfred J. Baranick
and
Charles S. McGuire
ATTORNEYS : 3,387,864
PIPE COUPLING
Joseph M. Walters, Allentown, Pa., assignor, by mesne assignments, to Amercoat Corp., Brea, Calif., a corporation of California
Filed July 19, 1965, Ser. No. 473,078
1 Claim. (Cl. 285—23)

ABSTRACT OF THE DISCLOSURE

A pipe coupling which includes a coupling member having a wall portion which fits into the abutted ends of the pipes and a radial flange portion extending from the surface of the wall portion and adapted to be engaged between the abutted ends, and which also includes a sleeve surrounding the area adjacent the abutted ends and cement interposed between all opposing surfaces of the coupling members, sleeve, and abutted ends.

---

This invention relates to coupling means useful in forming a joint between two abutting sections of pipe, or the like, and, more specifically, to a novel and improved means for joining pipe sections of equal inside diameter.

A number of different means have been employed for the purpose of joining two sections of pipe, ductwork, or the like, having substantially equal diameters, i.e., where the ends of the two sections abut and one does not fit into the other, as in bell and spigot couplings. For example, there are a number of commercially available duct tapes from which taped joints, suitable for some purposes, may be produced at relatively low cost. Under more severe conditions of operation, such as elevated temperatures and highly active chemical agents, a welded joint is usually recommended. Since many joints are made up in the field, i.e., as the pipe is installed in the location where it is to be used, it is important that the coupling means be easy and efficient to install. In joining plastic pipe sections during installation the resin and mat field weld is a common practice; in some cases this is carried out in combination with sleeves, split rings, etc.

It is a principal object of the present invention to provide an inexpensive and convenient means for making a field joint between two sections of pipe having substantially equal inside diameters at the ends to be joined.

Another object is to provide an insert or coupling member which may be engaged between two abutting pipe ends to assist in forming a joint, and which is simple and economical in manufacture, durable and effective in use, and easy and efficient in installation.

A still further object is to provide a cementable pipe coupling member which is especially suited for use with pipe or duct sections made to a controlled inside diameter.

Still another object is to provide a unique combination of elements including an annular coupling member and one or more separate sleeve elements with a suitable cement, as will appear more specifically in the following description, which combine to form a novel and improved pipe coupling well suited, although not solely limited, to use with pipes made of various plastic compositions.

Other objects of the invention will in part be obvious and will in part appear hereinafter.

The invention accordingly comprises the product possessing the features, properties and the relation of components which are exemplified in the following detailed disclosure, and the scope of the application of which will be indicated in the claims.

For a fuller understanding of the nature and objects of the invention, reference should be had to the following detailed description taken in connection with the accompanying drawing wherein.

A number of synthetic materials and compositions are presently used to fabricate pipe sections and fittings in applications where the physical properties of such materials are preferred to those of metal pipe, for example. The materials referred to include fiberglass reinforced polyester resin, laminates of glass tape or mats moulded together with various resins, and other composite products resulting from the combination of reinforcing material and plastic resin, preferably of the thermosetting type. While it will be readily apparent to those skilled in the art that the present invention is not limited solely to use with pipe sections made of such materials, the coupling will be described in combination with such pipe materials for purposes of illustration.

Figure 1:
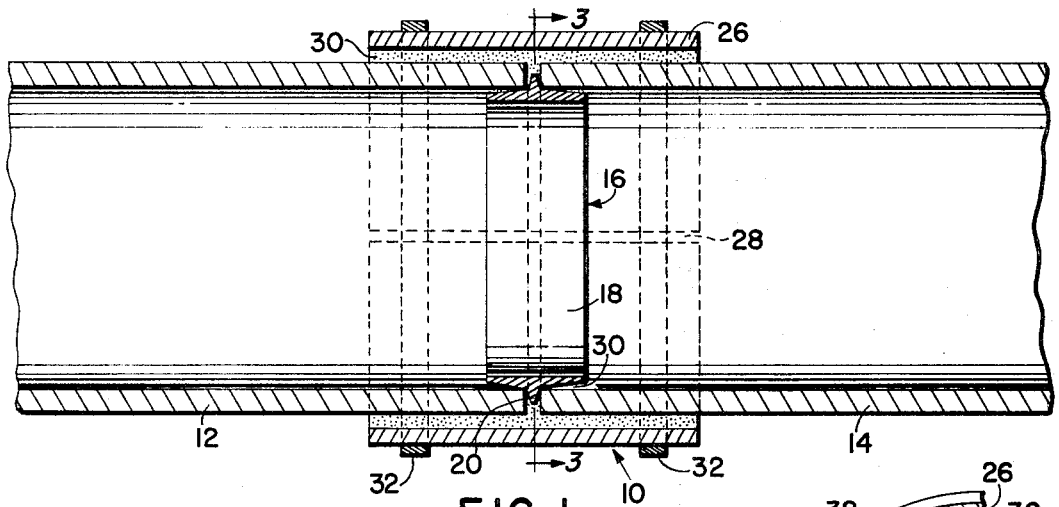
FIGURE 1 is an elevational view of one embodiment of the pipe coupling of the present invention, in vertical section through the center of the pipe ends shown.

Referring now to the drawing, in FIG. 1 is shown the coupling means of the present invention, generally indicated by the reference number 10, in combination with end portions of two sections of pipe, ductwork, or the like, numbered 12 and 14. It will be noted that pipe sections 12 and 14 are of equal inside diameters and substantially equal wall thickness. The pipe is preferably of the type which is made to a controlled inside diameter, but need not necessarily be such since sections of pipe made to equal and controlled outside diameters normally have inside diameters which are similar enough to permit use of the present invention, as will appear more fully hereinafter.

Figure 2:
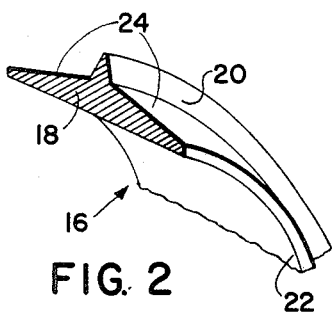
FIG. 2 is a fragmentary, perspective view of one of the elements shown in FIG. 1.

Coupling means 10 includes coupling member 16 comprising a substantially cylindrical wall portion or ring 18 with flange 20 projecting radially outward therefrom, as best seen in FIG. 2. Coupling member 16 may be conveniently and economically molded as a single piece from materials such as those used in forming the plastic or composition pipe sections, e.g., fiberglass reinforced plastic. While a wide variety of materials are suitable for fabrication of coupling member 16, it is desirable, of course, that the material used have a chemical resistance at least equal to that of the pipe with which it is to be used. A preferred method of fabrication is press or compression molding of a premix compound comprising a polyester or other resin. While the inside surface 22 of ring 18 is preferably of constant diameter, the outside 24, in the embodiment of FIGS. 1–3, tapers somewhat away from flange 20 toward the edges of the ring. It will also be noted that in the FIGS. 1–3 embodiment flange 20 tapers from a larger thickness at the point where it merges with surface 24 to a smaller thickness at the periphery of the flange.

The initial stage of assembly of coupling means 10 involves merely the insertion of one side of coupling member 16 into the open end of one of the pipe sections being laid or assembled. An end of the adjoining pipe section is then inserted over the portion of coupling member 16 on the opposite side of flange 20, whereby the flange is substantially engaged between the two abutting ends of the pipe sections and approximately equal portions of ring 18 extend into each section, as shown in FIG. 1. The adjoining sections of pipe will be held in axial alignment by the coupling member and there is also a tendency to correct any out of roundness of either pipe section at the end. The taper of surfaces 24 assists in the insertion of coupling member 16 into the ends of the pipe sections.

Figure 3:
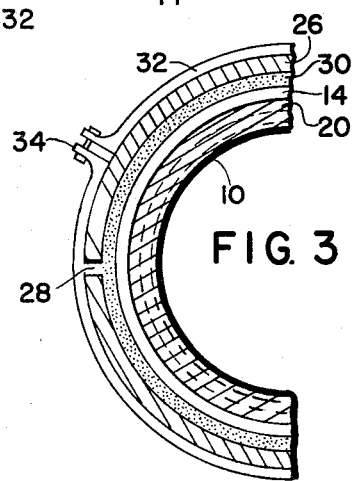
FIG. 3 is a fragmentary end section on the line 3—3 of FIG. 1.

The size of coupling member 16, of course, is dependent upon the size of the pipe sections with which it is to be used. The outside diameter of ring 18 in the area where surface 24 meets flange 20 is slightly smaller, 1/16" for example, than the inside diameter of pipe sections 12 and 14. Also, the height of flange 20, in the embodiment of FIGS. 1–3, is somewhat less than the thickness of the walls of the pipe sections, whereby the periphery of the flange does not extend to a position flush with the outside surfaces of the pipe sections. It is preferred, in coupling members of the FIG. 1 embodiment, that the height of flange 20 be approximately one-half the wall thickness of pipe sections 12 and 14, although this may vary considerably, as more fully described later herein.

After the pipe sections are aligned and abutted with coupling member 16 engaged therebetween, sleeve 26 is positioned over the joint, as seen in FIG. 1. Again, the dimensions of sleeve 26 are related to the size of the pipe with which it is to be used, a preferred length of the sleeve being equal to the diameter of the pipe. The wall thickness of the sleeve may be equal to or somewhat thinner than the wall thickness of the pipe. The inside diameter of sleeve 26 is somewhat greater than the outside diameter of the pipe sections. A longitudinal split 28 is cut along the length of the sleeve, whereby the diameter thereof may be varied slightly by either expansion or compression of the sleeve. Materials suitable for use in fabrication of the sleeve include those previously mentioned materials from which pipe sections 12 and 14 and coupling member 16 are made.

The annular space provided between the inside of sleeve 26 and the outside surface of pipe sections 12 and 14 is filled with a suitable cement 30 which also extends into any space between the ends of the pipe sections not occupied by flange 20. Cement 30 is also applied between all opposing surfaces of coupling member 16 and pipe sections 12 and 14. If desired, cement 30 may be applied to outer surface 24 and flange 20 of the coupling member before insertion thereof into the pipe sections. Similarly, cement 30 may be applied to the inside of sleeve 26 or to the outside surface of the pipe sections in the area of the joint before sleeve 26 is positioned thereon. Alternatively, a type of cement may be used which can be applied quickly and conveniently by conventional means such as a caulking gun after the other elements are positioned as shown. Although the composition of the cement is not critical, the chemical resistance thereof should be at least equal to that of the pipe material. As an illustrative example, it is suggested that a chemically resistant type of unsaturated polyester resin cement containing inert, amorphous and fibrous fillers, accelerated and catalyzed to set without the application of heat be used.

In order to hold sleeve 26 firmly in position while cement 30 sets, one or more circular clamping members 32 may be utilized. These members are in the nature of ordinary hose clamps and may be tightened to exert a compressive force on sleeve 26 by means such as those indicated at 34, or other conventional means. Although clamping members 32 are not essential to the formation of the pipe joint of the present invention, the use of such means is preferred. After cement 30 has firmly set clamping members 32 serve no further purpose and may be removed for use elsewhere.

It is also pointed out that split 28 in sleeve 26 is not essential, but is preferred to allow some radial deflection in the sleeve. A one piece, solid construction with no longitudinal split may be used, as may multi-piece constructions wherein a number of arcuate segments are arranged around the outside of the joint, with the spaces between the segments being the equivalent of split 28. For example, two substantially half-cylindrical elements could be used to form the split sleeve. For additional strength in the coupling, as in cases where the pipe is subjected to high pressures, it may be desirable to use two concentric split sleeves of different diameters with the longitudinal splits placed 90° apart. Alternatively, a relatively narrow strip could be placed in covering relation to, either inside or outside the longitudinal split. Such constructions would eliminate the area where coupling member 16 is covered only by a layer of cement.

Figure 4:
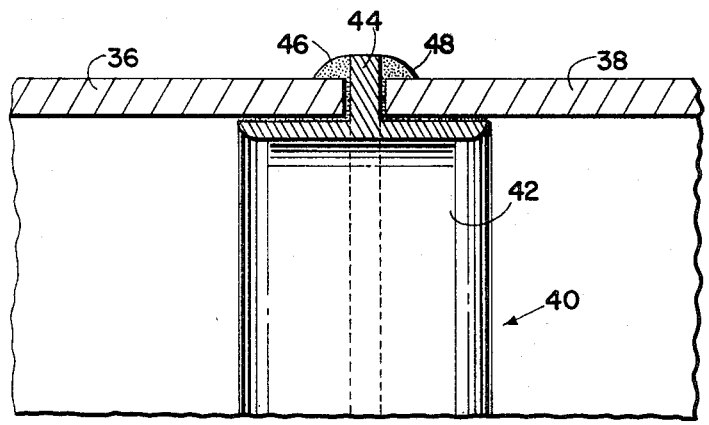
FIG. 4 is an elevational view, in section as in FIG. 1, of a second embodiment of the invention.

In FIG. 4 is shown a second embodiment of the invention, intended for use in situations where the pipe is not subjected to large pressures, as in ductwork, for example. Duct sections 36 and 38 are joined as in the previous embodiment with coupling member 40 having a ring-shaped wall portion 42 extending into each section and radial flange 44 therebetween. Coupling member 40 is seen to be substantially similar to coupling member 16 of the previous embodiment except that the height of flange 44 exceeds the wall thickness of duct sections 36 and 38. Fillets 46 and 48 of cement are applied to each side of the joint between the outside of duct sections 36 and 38 and the portion of flange 44 which extends outside the sections around the entire periphery thereof. The cement, of course, should have a composition compatible with that of the materials used for the other elements, but as in the previous embodiment many suitable cements are commercially available and the specific composition thereof forms no part of the present invention.

Since there is a slight decrease in the inside diameter of the pipe or duct sections at the joints it is preferred that the thickness of the wall portion of the coupling member be kept to a minimum, consistent with the other requirements of the member. A maximum thickness of about 1/8" is satisfactory for most purposes with plastic constructions such as those mentioned earlier. It is also preferred that the outer diameter of the ring portion of the coupling member be about 1/16" less than the inner diameter of the pipe sections to provide a 1/32" glue line all around the joint. The inner diameter of sleeve 26 in the FIGS. 1–3 embodiment should be about 1/16" to 1/4" larger than the outer diameter of the pipe sections, depending to some extent on the characteristics of the cement used. The height of flange 20 in applications such as that of FIG. 1 is preferably about one-half the thickness of the pipe walls, but may be greater than this if desired. In fact it is possible, though not preferred, to have a force fit between the periphery of the flange and the inside of the sleeve. Although the abutted ends of the pipe or duct sections, and therefore the coupling members and sleeves used in conjunction therewith, are shown to be cylindrical in form, in accordance with conventional construction, it will be understood that other forms are possible so long as the coupling members and sleeves are of compatible form with that of the abutted ends of the pipe sections with which they are used.

Since certain changes may be made in the above apparatus without departing from the scope of the invention herein involved, it is intended that all matter contained in the above description or shown in the accompanying drawing shall be interpreted as illustrative and not in a limiting sense.

What is claimed is:
1. A pipe coupling comprising, in combination:
   two substantially cylindrical sections of pipe having adjacent and axially aligned open end portions, said end portions and sections having substantially identical inside and outside diameters;
   a coupling member having a frustoconical wall portion extending into each of said end portions, the maximum outer diameter of said wall portion being only slightly smaller than the inner diameter of said end sections;
   a peripheral flange portion extending radially outward from said wall portion between and closely adjacent to said end portions, said maximum diameter of said wall portion being at the junction of said wall portion and said flange, and the height of said flange portion being substantially one-half of the thickness of the walls of said end portion;

a cylindrical sleeve surrounding both of said end portions and said peripheral flange portion, said cylindrical sleeve having an inner diameter only slightly larger than the outer diameter of said end portions and including a longitudinal split extending the full length of said sleeve, the axial extent of said sleeve being greater than the axial extent of said coupling member;

a cement composition substantially filling all the spaces between and adhering to said sleeve, said coupling member, and said end portions, said cement and coupling member having a chemical resistance at least equal to that of the pipe; and means for applying a compressive force to said sleeve at least until said cement has set.

References Cited

UNITED STATES PATENTS

| | | | |
|---|---|---|---|
| 769,869 | 9/1904 | Miller | 285—383 |
| 2,369,381 | 2/1945 | Unke | 285—286 X |
| 3,100,658 | 8/1965 | Miller et al. | 285—293 X |
| 3,224,795 | 12/1965 | Conley | 285—423 X |
| 3,233,922 | 2/1966 | Evans | 285—367 X |
| 1,001,682 | 8/1911 | Pratt | 285—294 X |

FOREIGN PATENTS

| | | |
|---|---|---|
| 358,855 | 1/1906 | France. |
| 1,014,803 | 8/1957 | Germany. |
| 1,041,751 | 10/1958 | Germany. |
| 1,046,427 | 12/1958 | Germany. |
| 289,902 | 5/1928 | Great Britain. |

CARL W. TOMLIN, *Primary Examiner.*

DAVE W. AROLA, *Assistant Examiner.*